United States Patent
Li et al.

(10) Patent No.: US 8,724,818 B2
(45) Date of Patent: May 13, 2014

(54) METHOD AND SYSTEM FOR SECURITY PROCESSING DURING RRC CONNECTION RE-ESTABLISHMENT

(75) Inventors: Jinglan Li, Shenzhen (CN); Xintai Wang, Shenzhen (CN); Lu Gan, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 19 days.

(21) Appl. No.: 13/574,772

(22) PCT Filed: Aug. 18, 2010

(86) PCT No.: PCT/CN2010/076103
§ 371 (c)(1),
(2), (4) Date: Jul. 23, 2012

(87) PCT Pub. No.: WO2011/088677
PCT Pub. Date: Jul. 28, 2011

(65) Prior Publication Data
US 2012/0308007 A1    Dec. 6, 2012

(30) Foreign Application Priority Data

Jan. 23, 2010    (CN) .......................... 2010 1 0119402

(51) Int. Cl.
*H04L 9/00* (2006.01)
(52) U.S. Cl.
USPC .......................................... 380/277; 380/270
(58) Field of Classification Search
USPC ............ 380/270; 455/423, 425, 437; 370/328
See application file for complete search history.

(56) References Cited

U.S. PATENT DOCUMENTS

| 8,284,941 B2 * | 10/2012 | Forsberg ....................... 380/272 |
| 2005/0047597 A1 | 3/2005 | Zheng |

(Continued)

FOREIGN PATENT DOCUMENTS

| CN | 1426185 A | 6/2003 |
| CN | 101702818 A | 5/2010 |

(Continued)

OTHER PUBLICATIONS

3GPP TS 33.401 V9.2.0 (Dec. 2009) (3rd Generation Partnership Project; Technical Specification Group Services and System Aspects; 3GPP System Architecture Evolution (SAE): Security architecture (Release 9) pp. 1-104, 2009.*

(Continued)

*Primary Examiner* — Samson Lemma
(74) *Attorney, Agent, or Firm* — Knobbe, Martens, Olson & Bear, LLP

(57) ABSTRACT

This disclosure claims a method for security processing during RRC connection re-establishment, comprising: a UE sends an RRC connection re-establishment request message to the eNB; after receiving the request message, the eNB determines whether an original access layer security algorithm used by the UE is supported by the eNB itself according to the current status and configuration; if supported, the communication protection with UE is implemented via the original access layer security algorithm; if not supported, according to the security capability of UE, the access layer security algorithm which has the highest priority and is supported by the UE is selected from the access layer security algorithms configured by the eNB itself to be the new access layer security algorithm, and the communication protection between the eNB and the UE is implemented by the new access layer security algorithm. This disclosure also claims a system for security processing during the RRC connection re-establishment.

20 Claims, 6 Drawing Sheets

(56) References Cited

U.S. PATENT DOCUMENTS

| | | | |
|---|---|---|---|
| 2011/0077010 A1* | 3/2011 | Xu et al. | 455/437 |
| 2011/0230183 A1* | 9/2011 | Tanaka et al. | 455/423 |
| 2011/0230185 A1* | 9/2011 | Tanaka et al. | 455/425 |
| 2012/0002636 A1* | 1/2012 | Xiao et al. | 370/329 |
| 2012/0269099 A1* | 10/2012 | Chin et al. | 370/259 |
| 2012/0276897 A1* | 11/2012 | Kwon et al. | 455/423 |

FOREIGN PATENT DOCUMENTS

| | | |
|---|---|---|
| EP | 2139285 A2 | 12/2009 |
| WO | 2008092999 A1 | 8/2008 |
| WO | WO 2008092999 A1 * | 8/2008 |

OTHER PUBLICATIONS

3GPP TS 33.401 version 8.5.0 Release 8 Oct. 31, 2009 in 96 pages.
International Search Report mailed on Nov. 25, 2010 in PCT/CN2010/076103 in 4 pages.
3rd Generation Partnership Project: "Digital Cellular telecommunications system (Phase +2); Universal Mobile Telecommunications System (UTMS); LTE; 3GPP System Architecture Evolution (SAE); Security architecture (3GPP TS 33.401 version 9.2.0 Release 9)" dated Dec. 2009 in 104 pages.
Supplementary European Search Report in Application No. EP 10 84 3717 dated May 10, 2013 in 6 pages.
ZTE Coproration, et al: "RRC Connection Re-establishment Algorithms" dated Feb. 1-5, 2010 in 4 pages.

* cited by examiner

METHOD AND SYSTEM FOR SECURITY PROCESSING DURING RRC CONNECTION RE-ESTABLISHMENT

CROSS-REFERENCE TO RELATED APPLICATIONS

This application is the U.S. National Phase application under 35 U.S.C. §371 of International Application PCT/CN2010/076103, filed Aug. 18, 2010, which claims priority to Chinese Application 201010119402.5, filed Jan. 23, 2010.

FIELD OF THE INVENTION

This disclosure relates to the technical field of security of mobile communication, and in particular to a method and system for security processing during Radio Resource Control (RRC) connection re-establishment.

BACKGROUND OF THE INVENTION

In a Long Term Evolution (LTE) system, the RRC functions of networks are located in the Evolved Universal Terrestrial Radio Access Network (E-UTRAN) NodeB (eNB), and the corresponding security protection mechanisms of RRC are also located in the eNB. As there are lots of eNBs allocated widely, the network entities among the access layers are highly dispersed regardless the geographical positions or the logical relationships, and operators cannot implement centralized security control for the eNBs. Each eNB is located in an unsafe area, so each eNB needs to select a security algorithm for the access layer security mechanism between the eNB and each User Equipment (UE) according to the security capability of the UE, so as to protect the communication security between the eNB and the UE.

According to the description of the current 33.401 protocol, during an initial context establishment process initiated by a Mobility Management Entity (MME), the MME can carry information of the security capability of the UE to the eNB in an initial context establishment request message. Then, the eNB selects the security algorithm between the eNB and the UE according to the following principles: selecting the security algorithm which has the highest priority configured by the eNB and is supported by the UE as the final access layer security algorithm, according to the security capability of the UE and the security algorithm configured by the eNB itself, wherein the access layer security algorithm comprises an access layer signaling integrity protection algorithm and a signaling and data encryption algorithm. After that, if the security algorithms need to be updated, the security algorithms are also selected according to the above principle.

According to the descriptions of the 33.401 protocol and the 36.331 protocol, under normal conditions, the access layer security algorithm does not change. Only when implementing handover, the eNB needs to re-select the new access layer security algorithm according to the security capability of the UE and the current security algorithm configured by the eNB on the basis of the above algorithm selecting principle. Then the newly-selected access layer security algorithm is notified to the UE via an RRC re-configuration message. After the re-configuration is successful, the UE starts to use the new access layer security algorithm to communicate with the eNB, that is, to use the new access layer security algorithm to implement integrity protection and signaling and data encryption from an RRC re-configuration completion message.

In the current RRC connection re-establishment processing flow, as shown in FIG. 1, no matter under what circumstances the UE sends an RRC connection re-establishment request message to the eNB, the eNB needs not to update the access layer security algorithm, and the security algorithm is not carried in the RRC connection re-establishment message which is sent to the eNB by the UE.

In the LTE, each eNB respectively maintains the access layer security parameters between the eNB and the UE, including: an access layer security algorithm and a security key. As the security algorithm supported by each eNB is configured and maintained respectively by each eNB, the supporting condition for the security algorithm implemented by each eNB cannot be completely the same. That is, a security algorithm supported by eNB1 cannot be completely supported by eNB2. Then under the condition that the eNB2 does not support the security algorithm configured by the eNB1, when the UE tries to RRC re-establish to the eNB2 due to a handover failure to the eNB2, the UE still uses the original security algorithm to perform integrity protection and encryption for the RRC re-establishment completion message if a new security algorithm is not re-selected according to the security algorithm supported by the eNB2. And then the eNB2 must fail to perform decryption and integrity check for the RRC re-establishment message because of not supporting the original security algorithm used by the UE, which can finally cause the UE access failure, and greatly influence the user experience.

SUMMARY OF THE INVENTION

Based on the above, the technical problem to be solved by this disclosure is to provide a method and system for security processing during RRC connection re-establishment, so as to solve the problem that a related art cannot update the access layer security algorithm during the RRC connection re-establishment, and then the UE access failure is caused.

In order to achieve the purpose, the technical solution of this disclosure is described below.

This disclosure provides a method for security processing during RRC connection re-establishment, comprising:

a UE sending an RRC connection re-establishment request message to an Evolved Universal Terrestrial Radio Access Network (E-UTRAN) NodeB (eNB); and after receiving the RRC connection re-establishment request message, the eNB determining whether an original access layer security algorithm used by the UE is supported by the eNB itself according to a current status and configuration; and if supported, communication protection between the eNB and the UE being implemented via the original access layer security algorithm; if not supported, according to the security capability of the UE, a access layer security algorithm which has the highest priority and is supported by the UE being selected from access layer security algorithms configured by the eNB itself to be a new access layer security algorithm, and the communication protection between the eNB and the UE being implemented by the new access layer security algorithm.

The step that the eNB determines whether the original access layer security algorithm used by the UE is supported by the eNB itself specifically comprises:

according to the current status and configuration, if the eNB determines that the eNB itself is a source eNB connected to the UE before the UE sends the RRC connection re-establishment request message, determining that the eNB supports the original access layer security algorithm used by the UE; and according to the current status and configuration, if the eNB determines that the eNB itself is a target eNB during handover of the UE, the eNB determining whether an access layer security algorithm configured by the eNB itself supports the original access layer security algorithm used by the UE according to an original access layer security algorithm carried by a source eNB when sending a handover request message.

The access layer security algorithm comprises an integrity protection algorithm and an encryption algorithm, and the eNB determining whether the access layer security algorithm configured by the eNB itself supports the original access layer security algorithm used by the UE comprises:

if an integrity protection algorithm configured by the eNB itself supports an original integrity protection algorithm used by the UE, and an encryption algorithm configured by the eNB itself supports an original encryption algorithm used by the UE, the access layer security algorithm configured by the eNB being determined to support the original access layer security algorithm used by the UE; otherwise, the access layer security algorithm configured by the eNB being determined not to support the original access layer security algorithm used by the UE.

The step of implementing communication protection between the eNB and the UE via the original access layer security algorithm specifically comprises:

the eNB performing local configuration according to the original access layer security algorithm;

the eNB generating a RRC connection re-establishment message and sending the message to the UE, and a flag representing whether an access layer security algorithm configuration cell exists in the RRC connection re-establishment message being set to be "non-existence";

after receiving the RRC connection re-establishment message, the UE determining that the flag representing whether the access layer security algorithm configuration cell exists in the message is set to be "non-existence", and performing local configuration according to information carried in the RRC connection re-establishment message, wherein configuration of the access layer security algorithm does not change;

the UE generating a RRC connection re-establishment complete message, and sending the message to the eNB after performing integrity protection and encryption for the message by using the original access layer security algorithm; and after receiving the RRC connection re-establishment complete message, the eNB performing decryption and integrity check for the received message by using the original access layer security algorithm.

The step of implementing the communication protection between the eNB and the UE via the new access layer security algorithm specifically comprises:

the eNB performing local configuration according to the new access layer security algorithm;

the eNB generating a RRC connection re-establishment message and sending the message to the UE, wherein the RRC connection re-establishment message carries the new access layer security algorithm and a flag representing whether an access layer security algorithm configuration cell exists in the message is set to be "existence";

after receiving the RRC connection re-establishment message, the UE determining that the flag representing whether the access layer security algorithm configuration cell exists in the message is set to be "existence", performing local configuration according to information carried in the RRC connection re-establishment message, and enabling the new access layer security algorithm carried in the message;

the UE generating a RRC connection re-establishment complete message, and sending the message to the eNB after performing integrity protection and encryption for the message by using the new access layer security algorithm; and after receiving the RRC connection re-establishment complete message, the eNB performing decryption and integrity check for the received message by using the new access layer security algorithm.

This disclosure also provides a method for security processing during RRC connection re-establishment, comprising:

a UE sending a RRC connection re-establishment request message to an eNB; and after receiving the RRC connection re-establishment request message, according to security capability of the UE, the eNB selecting an access layer security algorithm which has the highest priority and is supported by the UE from access layer security algorithms configured by the eNB itself as a new access layer security algorithm, and implementing communication protection between the eNB and the UE via the new access layer security algorithm.

The step of implementing communication protection between the eNB and the UE via the new access layer security algorithm specifically comprises:

the eNB performing local configuration according to the new access layer security algorithm;

the eNB generating a RRC connection re-establishment message and sending the message to the UE, wherein the RRC connection re-establishment message carries the new access layer security algorithm and a flag representing whether an access layer security algorithm configuration cell exists in the message is set to be "existence";

after receiving the RRC connection re-establishment message, the UE determining that the flag representing whether the access layer security algorithm configuration cell exists in the message is set to be "existence", performing local configuration according to information carried in the RRC connection re-establishment message, and enabling the new access layer security algorithm carried in the message;

the UE generating a RRC connection re-establishment complete message, and sending the message to the eNB after performing integrity protection and encryption for the message by using the new access layer security algorithm; and after receiving the RRC connection re-establishment complete message, the eNB performing decryption and integrity check for the received message by using the new access layer security algorithm.

This disclosure also provides a system for security processing during RRC connection re-establishment, comprising: a UE and an eNB, the UE is configured to send a RRC connection re-establishment request message to the eNB, and implement communication protection between the eNB and the UE, and the eNB is configured to, after receiving the RRC connection re-establishment request message, determine whether an original access layer security algorithm used by the UE is supported by the eNB itself according to a current status and configuration; and if supported, implement the communication protection between the eNB and the UE via the original access layer security algorithm; and if not supported, according to security capability of the UE, select an access layer security algorithm which has the highest priority and is supported by the UE from access layer security algorithms configured by the eNB itself to be a new access layer security algorithm, and to implement the communication protection between the eNB and the UE via the new access layer security algorithm.

The eNB is further configured to, according to the current status and configuration, if determining that the eNB itself is a source eNB which is connected to the UE before the UE sends the RRC connection re-establishment request message, determine that the eNB supports the original access layer security algorithm used by the UE; and according to the current status and configuration, if determining that the eNB itself is a target eNB during handover of the UE, determine whether an access layer security algorithm configured by the eNB itself supports the original access layer security algorithm used by the UE, according to an original access layer security algorithm carried by a source eNB when sending a handover request message.

The access layer security algorithm comprises an integrity protection algorithm and an encryption algorithm, and the eNB is further configured to, if an integrity protection algorithm configured by the eNB itself supports an original integrity protection algorithm used by the UE, and an encryption algorithm configured by the eNB itself supports an original encryption algorithm used by the UE, determine that the access layer security algorithm configured by the itself supports the original access layer security algorithm used by the UE; otherwise, determine that the access layer security algorithm configured by the eNB itself does not support the original access layer security algorithm used by the UE.

The eNB is further configured to perform local configuration according to the original access layer security algorithm when implementing communication protection between the eNB and the UE via the original access layer security algorithm, generate a RRC connection re-establishment message and send the message to the UE, and set the flag representing whether the access layer security algorithm configuration cell exists in the RRC connection re-establishment message to be "non-existence";

the UE is further configured to determine that the flag representing whether the access layer security algorithm configuration cell exists in the message is set to be "non-existence" after receiving the RRC connection re-establishment message, and perform the local configuration according to information carried in the RRC connection re-establishment message, wherein configuration of the access layer security algorithm does not change; and generate a RRC connection re-establishment complete massage, and send the message to the eNB after performing integrity protection and encryption for the message by using the original access layer security algorithm; and the eNB is further configured to, after receiving the RRC connection re-establishment complete message of the UE, use the original access layer security algorithm to perform decryption and integrity check for the received message.

The eNB is further configured to perform the local configuration according to the new access layer security algorithm when implementing the communication protection between the eNB and the UE via the new access layer security algorithm, generate a RRC connection re-establishment message and send the message to the UE, wherein the RRC connection re-establishment message carries the new access layer security algorithm, and a flag representing whether an access layer security algorithm configuration cell exists in the message is set to be "existence";

the UE is further configured to, after receiving the RRC connection re-establishment message, determine that the flag representing whether the access layer security algorithm configuration cell exists in the message is set to be "existence", perform the local configuration according to information carried in the RRC connection re-establishment message, and enable the new access layer security algorithm carried in the message; and generate a RRC connection re-establishment complete message, and send the message to the eNB after performing integrity protection and encryption for the message via the new access layer security algorithm; and the eNB is further configured to, after receiving the RRC connection re-establishment complete message of the UE, perform decryption and integrity check for the received message by using the new access layer security algorithm.

This disclosure also provides a system for security processing during RRC connection re-establishment, comprising: a UE and an eNB, wherein the UE is configured to send a RRC connection re-establishment request message to the eNB, and implement communication protection between the eNB and the UE, and the eNB is configured to, after receiving the RRC connection re-establishment request message, according to security capability of the UE, select an access layer security algorithm which has the highest priority and is supported by the UE from access layer security algorithms configured by the eNB itself as a new access layer security algorithm, and implement the communication protection between the eNB and the UE via the new access layer security algorithm.

The eNB is further configured to perform the local configuration according to the new access layer security algorithm when implementing the communication protection between the eNB and the UE via the new access layer security algorithm, generate a RRC connection re-establishment message and send the message to the UE, wherein the RRC connection re-establishment message carries the new access layer security algorithm, and a flag representing whether an access layer security algorithm configuration cell exists in the message is set to be "existence";

the UE is further configured to, after receiving the RRC connection re-establishment message, determine that the flag representing whether the access layer security algorithm configuration cell exists in the message is set to be "existence", perform the local configuration according to information carried in the RRC connection re-establishment message, and enable the new access layer security algorithm carried in the message; and generate a RRC connection re-establishment complete message, and send the message to the eNB after performing integrity protection and encryption for the message by using the new access layer security algorithm; and the eNB is further configured to, after receiving the RRC connection re-establishment complete message of the UE, perform decryption and integrity check for the received message by using the new access layer security algorithm.

This disclosure provides a method and system for security processing during RRC connection re-establishment. When a UE is RRC connection re-established to the target eNB during handover, if the target eNB does not support the original access layer security algorithm used by the UE, the target eNB only needs to re-select the access layer security algorithm for one time, and notify the UE by the RRC connection re-establishment message. The unnecessary RRC connection failure can be prevented. Thereby, the access success rate of UE is improved, and the experience of the users is enhanced.

DETAILED DESCRIPTION OF THE EMBODIMENTS

The technical solution of this disclosure is further described in details below with reference to the drawings and embodiments.

In order to solve the problem that in the related art, the access layer security algorithm cannot be updated during RRC connection re-establishment, and then the UE access failure is caused, this disclosure extends the RRC connection re-establishment message, adds the access layer security algorithm configuration cell in the RRC connection re-establishment message, and adds the flag representing whether the cell exists.

Based on the message extension, the main idea of the method for security processing during RRC connection re-establishment provided by this disclosure is that: after receiving the RRC connection re-establishment request message, the eNB determines whether the original access layer security algorithm used by the UE is supported by the eNB itself according to the current status and configuration; if supported, the access layer security algorithm needs not to be updated, and the communication protection between the eNB and the UE can be implemented via the original access layer security algorithm; and if not supported, the access layer security algorithm needs to be updated, and the eNB selects the access layer security algorithm which has the highest priority and is supported by the UE from the access layer security algorithms configured by the eNB itself as the new access layer security algorithm, and implements communication protection between the eNB and the UE via the new access layer security algorithm.

Figure 1:
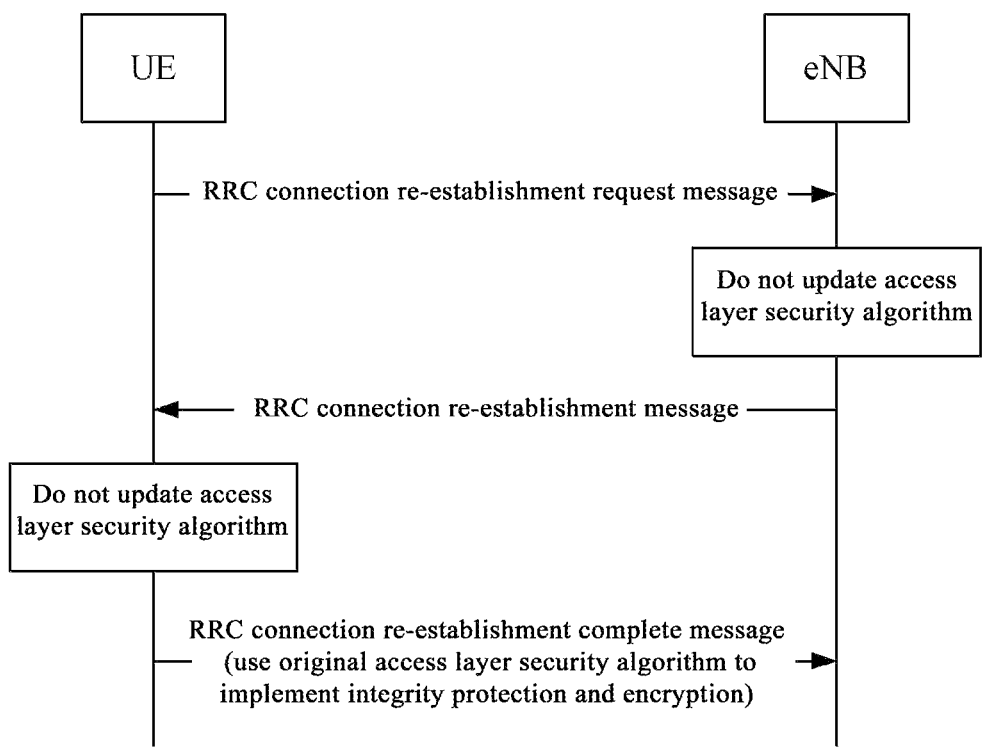
FIG. 1 shows a processing flowchart of RRC connection re-establishment in the related art.
Figure 2:
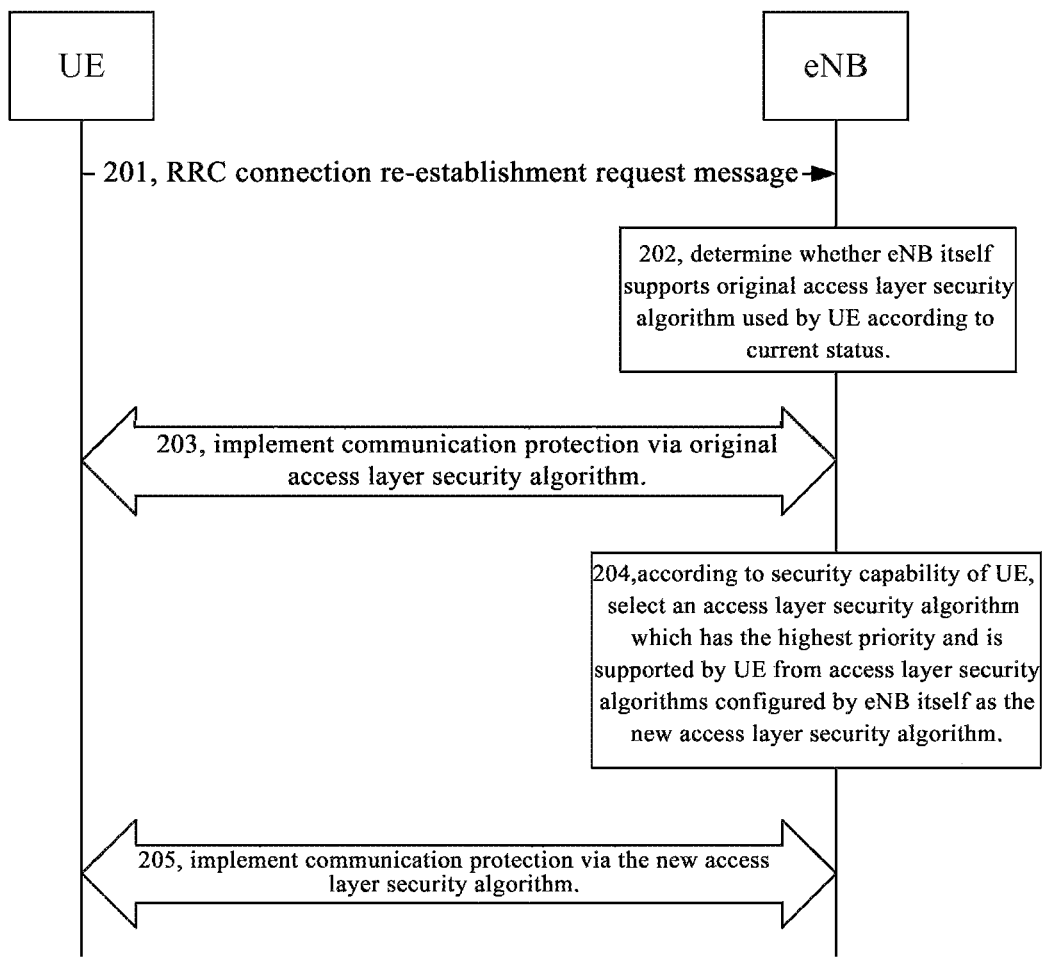
FIG. 2 shows a flowchart of a method for security processing during RRC connection re-establishment of this disclosure.

Based on the main idea above, as shown in FIG. 2, the specific operation flow mainly comprises the following steps.

Step 201, the UE sends the RRC connection re-establishment request message to the eNB.

Step 202, after receiving the RRC connection re-establishment request message, the eNB determines whether the original access layer security algorithm used by the UE is supported by the eNB itself according to the current status and configuration; and if supported, performing Step 203; otherwise, performing Steps 204 to 205 (dotted line shown in the Figure).

According to the current status and configuration, if the eNB determines that itself is the source eNB which is connected to the UE before the UE sends the RRC connection re-establishment request message, it means that the eNB supports the original access layer security algorithm used by the UE, that is, the access layer security algorithm needs not to be updated, and the original access layer security algorithm used by the UE can still be used. According to the current status and configuration, if the eNB determines that itself is the target eNB of the UE during the handover, the eNB determines whether the access layer security algorithm configured by the eNB itself supports the original access layer security algorithm used by the UE, according to the original access layer security algorithm carried by the source eNB when sending the handover request message. And here, the access layer security algorithm comprises the integrity protection algorithm and the encryption algorithm. If the integrity protection algorithm configured by the eNB itself supports the original integrity protection algorithm used by the UE, and the encryption algorithm configured by the eNB itself supports the original encryption algorithm used by the UE, the access layer security algorithm configured by the eNB is determined to support the original access layer security algorithm used by the UE; otherwise, (namely, at least one of the integrity protection algorithm and the encryption algorithm does not support), the access layer security algorithm configured by the eNB is determined to not support the original access layer security algorithm used by the UE.

Step 203, the communication protection between the eNB and the UE is implemented via the original access layer security algorithm.

Step 204, according to the security capability of the UE, the eNB selects the access layer security algorithm which has the highest priority and is supported by the UE from the access layer security algorithms configured by the eNB itself as the new access layer security algorithm.

Step 205, the communication protection between the eNB and the UE is implemented via the new access layer security algorithm.

It should be noted that, for the eNB side, if the communication protection between the eNB and the UE is implemented via the original access layer security algorithm, the eNB needs to perform the local configuration according to the original access layer security algorithm. When generating the RRC connection re-establishment message and sending the message to the UE, the flag representing whether the access layer security algorithm configuration cell in the RRC connection re-establishment message exists is set to be "non-existence". After receiving the RRC connection re-establishment complete message from the UE, the eNB uses the original access layer security algorithm to perform decryption and integrity check for the received message. If the communication protection between the eNB and the UE is implemented via the new access layer security algorithm, the eNB needs to perform local configuration according to the new access layer security algorithm. When generating the RRC connection re-establishment message and sending the message to the UE, the RRC connection re-establishment message carries the new access layer security algorithm, and the flag representing whether the access layer security algorithm configuration cell exists in the message is set to be "existence". After receiving the RRC connection re-establishment complete message from the UE, the eNB uses the new access layer security algorithm to perform decryption and integrity check for the received message.

For the UE side, after receiving the RRC connection re-establishment message from the eNB, the UE needs to determine whether the access layer security algorithm needs to be updated according to the flag representing whether the access layer security algorithm configuration cell in the message exists. If yes, enable the new access layer security algorithm carried in the message; otherwise, still use the original access layer security algorithm. Specifically, after receiving the RRC connection re-establishment message, if the UE determines that the flag representing whether the access layer security algorithm configuration cell exists in the message is set to be "non-existence", then the UE implements local configuration according to the information carried in the RRC connection re-establishment message, wherein the configuration of the access layer security algorithm does not change, and sends the generated RRC connection re-establishment complete message to the eNB after performing integrity protection and encryption for the message by using the access layer security algorithm. After receiving the RRC connection re-establishment message, if the UE determines that the flag representing whether the access layer security algorithm configuration cell exists in the message is set to be "existence", the UE implements local configuration according to the information carried in the RRC connection re-establishment message, enables the new access layer security algorithm carried in the message, and then sends the established RRC connection re-establishment complete message to the eNB after performing integrity protection and encryption for the message by using the new access layer security algorithm.

Corresponding to the method for security processing during RRC connection re-establishment shown in FIG. 2, this disclosure provides a system for security processing during RRC connection re-establishment, comprising the UE and the eNB, wherein the UE is configured to send the RRC connection re-establishment request message to the eNB, and implement communication protection between the eNB and the UE. The eNB is configured to determine whether the original access layer security algorithm used by the UE is supported by the eNB itself according to the current status and configuration after receiving the RRC connection re-establishment request message; and if supported, implement the communication protection between the eNB and the UE via the original access layer security algorithm; if not supported, according to the security capability of the UE, select the access layer security algorithm which has the highest priority and is supported by the UE from the access layer security algorithms configured by eNB itself to be the new access layer security algorithm, and implement the communication protection between the eNB and the UE via the new access layer security algorithm.

In addition, based on the message extension, this disclosure also provides another method for security processing during RRC connection re-establishment. The main idea is that: after receiving the RRC connection re-establishment request message, according to the security capability of the UE, the eNB selects the access layer security algorithm which has the highest priority and is supported by the UE from the access layer security algorithms configured by the eNB itself as the new access layer security algorithm, and implements communication protection between the eNB and the UE via the new access layer security algorithm. That is, when RRC connection re-establishment occurs, the eNB which receives the RRC connection re-establishment request message does not determine whether the original access layer security algorithm used by the UE is supported by the eNB itself, and the eNB updates the access layer security algorithm in all situations. That is, no matter whether the access layer security algorithm needs to be updated, the eNB which receives the RRC connection re-establishment request message re-selects the new access layer security algorithm according to the security algorithm principle, and notifies it to the UE via the RRC connection re-establishment message.

It can be seen that both the two methods for security processing during RRC connection re-establishment can update the access layer security algorithms during RRC connection re-establishment, so as to avoid the unnecessary RRC connection failure.

The methods for security processing during RRC connection re-establishment is further described in details below with reference to the embodiments.

Figure 3:
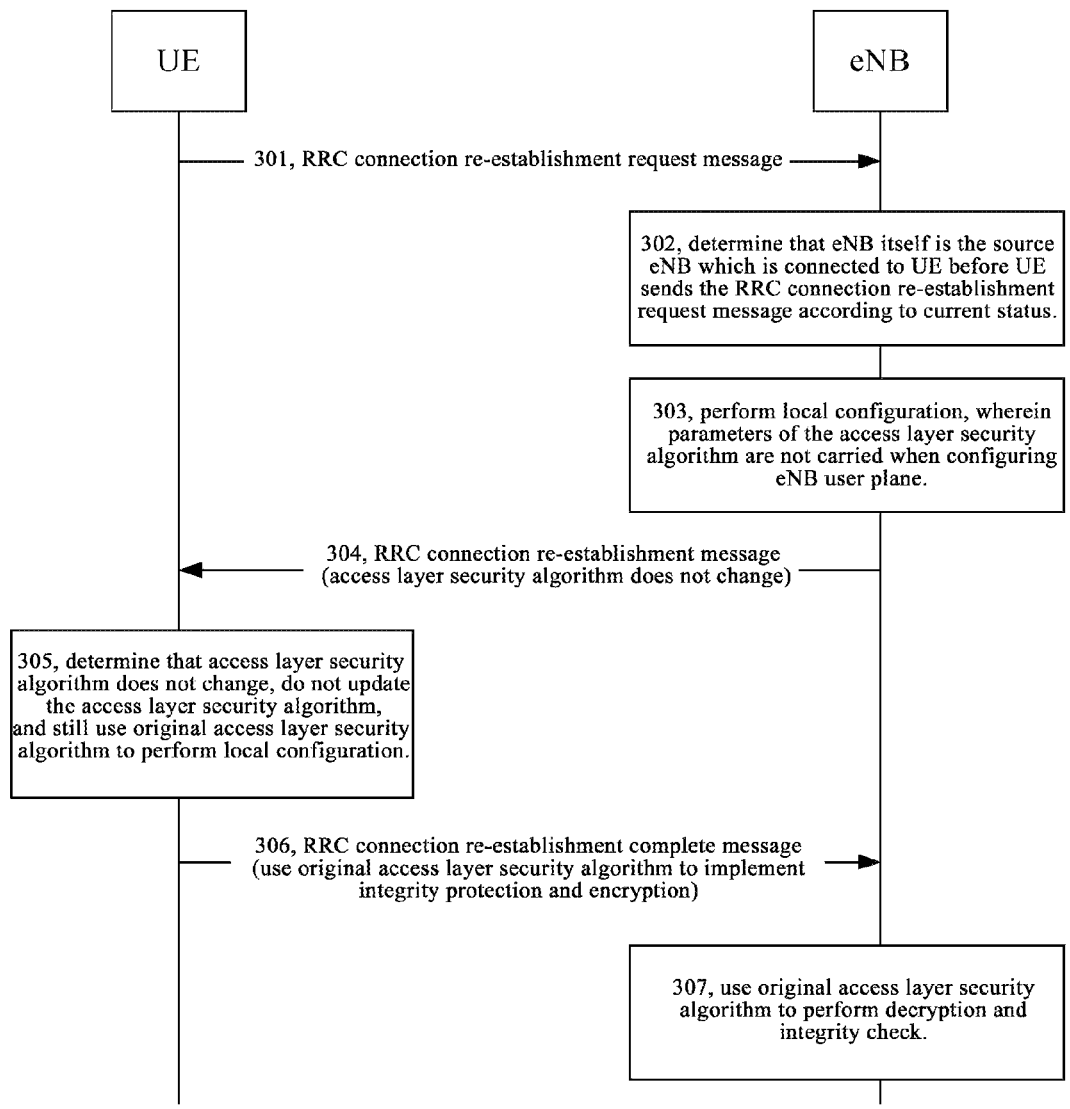
FIG. 3 shows a flowchart of a method for security processing during RRC connection re-establishment of embodiment I of this disclosure.

In the embodiment I of this disclosure, the eNB is the source eNB which is connected to the UE before sending the RRC connection re-establishment request message to the UE, and the access layer security algorithm needs not to be updated. Specifically, as shown in FIG. 3, the method mainly comprises the following steps.

Step 301, the UE sends the RRC connection re-establishment request message to the eNB, Step 302, after receiving the RRC connection re-establishment request message, the eNB determines whether the eNB itself is the source eNB which is connected to the UE before the UE sends the RRC connection re-establishment request message according to the current status and configuration.

Step 303, the eNB performs local configuration, wherein the access layer security algorithm is not carried when configuring the eNB user plane, that is, the configuration of the original access layer security algorithm is still used.

Step 304, the eNB generates the RRC connection re-establishment message, and sends the message to the UE, wherein the flag representing whether the access layer security algorithm configuration cell exists in the message is set to be "non-existence".

Step 305, after receiving the RRC connection re-establishment message, the UE determines that the flag representing whether the access layer security algorithm configuration cell exists in the message is set to be "non-existence". It represents that the access layer security algorithm does not change. The UE performs local configuration according to the information carried in the RRC connection re-establishment message, wherein the configuration of the access layer security algorithm does not change.

Step 306, the UE generates the RRC connection re-establishment complete message, and sends the message to the eNB after using the original access layer security algorithm to implement integrity protection and encryption for the message.

Step 307, the eNB receives the RRC connection re-establishment complete message from the UE, and uses the original access layer security algorithm to perform decryption and integrity check for the message. The flow ends.

Figure 4:
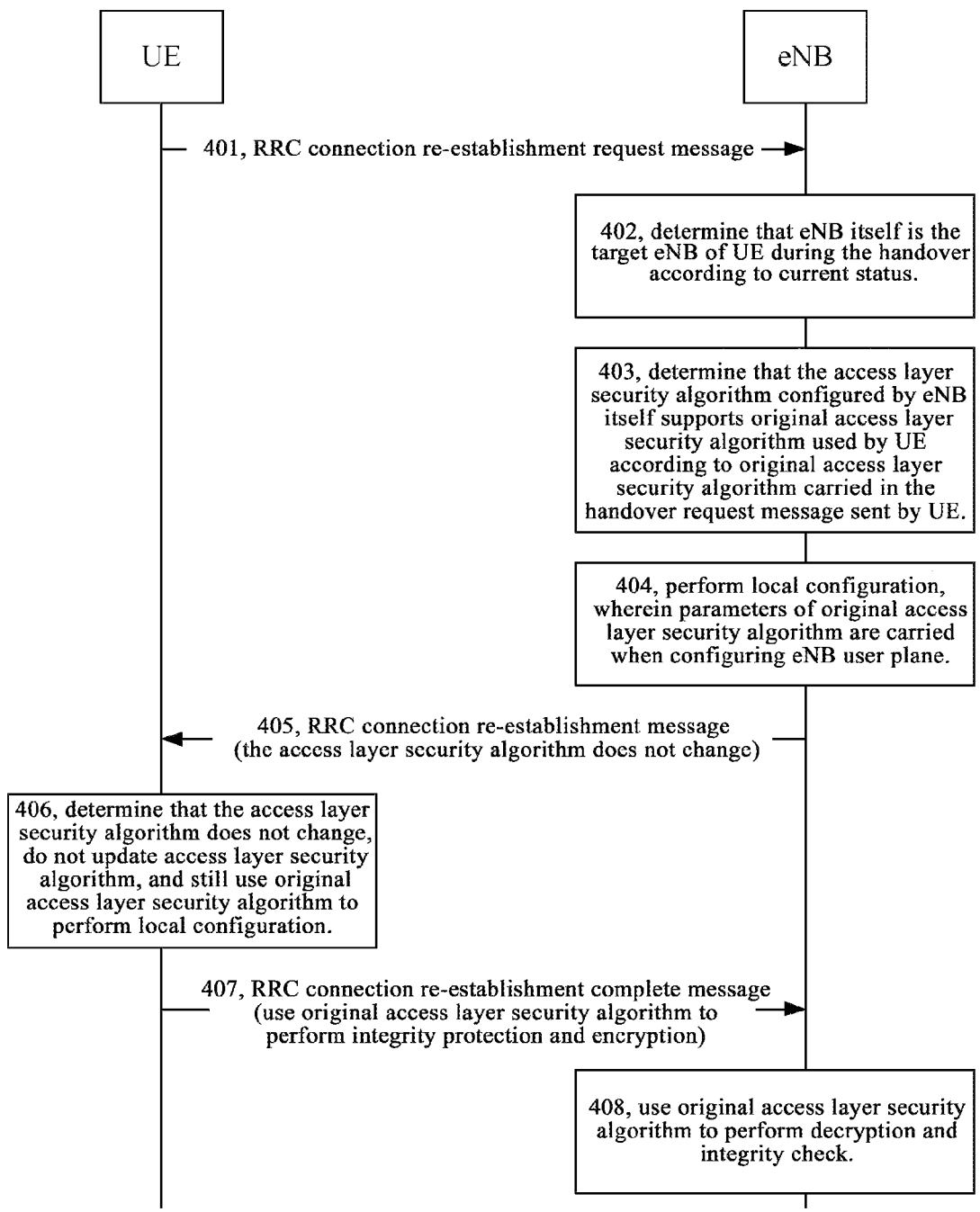
FIG. 4 shows a flowchart of a method for security processing during RRC connection re-establishment of embodiment II of this disclosure.

In the embodiment II of this disclosure, the UE initiates the RRC connection re-establishment after X2 or S1 handover fails, and the RRC connection re-establishment request message is sent to the target eNB of the UE during the handover. It can be that it is requested to be re-established to the cell connection of the target eNB during the handover, and also can be that it is requested to be re-established to other cell connections of the target eNB. The target eNB supports the original access layer security algorithm used by the UE, and the access layer security algorithm does not need to be updated. The specific slow is as shown in FIG. 4, mainly comprising the following steps.

Step 401, the UE sends the RRC connection re-establishment request message to the eNB.

Step 402, after receiving the RRC connection re-establishment request message, the eNB determines that itself is the target eNB during handover of the UE according to the current status and configuration.

Step 403, according to the original access layer security algorithm carried in the handover request message sent by the source eNB, the eNB (target eNB) determines that the access layer security algorithm configured by the eNB itself supports the original access layer security algorithm used by the UE, wherein both the integrity protection algorithm and the encryption algorithm need to be determined.

Step 404, the eNB (target eNB) performs local configuration, wherein the original access layer security algorithm is carried when configuring the eNB (target eNB) user plane, that is, the original access layer security algorithm is still used.

Step 405, the eNB (target eNB) generates the RRC connection re-establishment message, and sends the message to the UE, wherein the flag representing whether the access layer security algorithm configuration cell exists in the message is set to be "non-existence".

Step 406, after receiving the RRC connection re-establishment message, the UE determines that the flag representing whether the access layer security algorithm configuration cell exists in the message is set to be "non-existence". It represents that the access layer security algorithm does not change. The UE performs local configuration according to the information carried in the RRC connection re-establishment message, wherein the configuration of the access layer security algorithm does not change.

Step 407, the UE generates the RRC connection re-establishment complete message, and sends the message to the eNB (target eNB) after performing integrity protection and encryption for the message by using the original access layer security algorithm.

Step 408, the eNB (target eNB) receives the RRC connection re-establishment complete message from the UE, and performs decryption and integrity check for the message by using the original access layer security algorithm. The flow ends.

Figure 5:
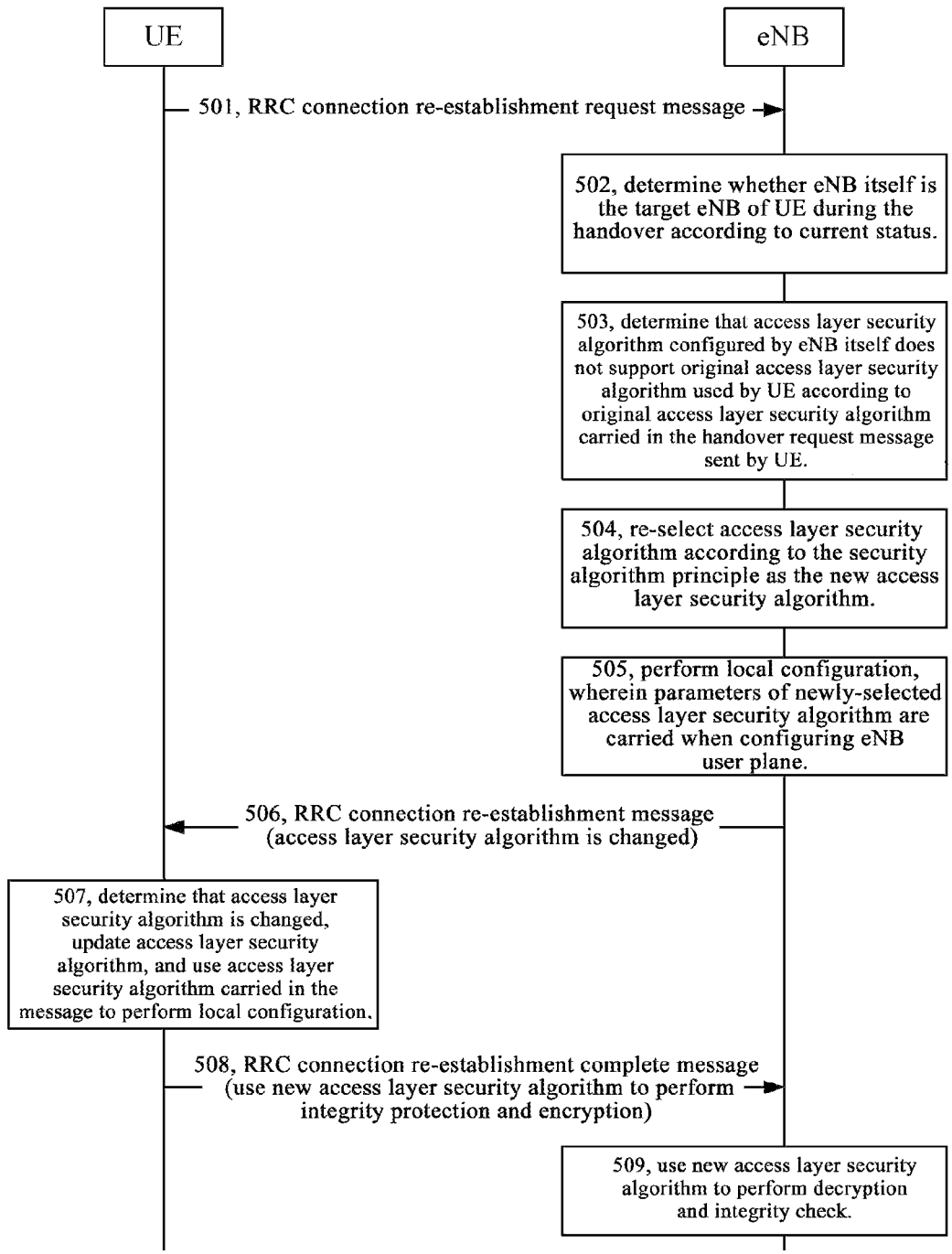
FIG. 5 shows a flowchart of a method for security processing during RRC connection re-establishment of embodiment III of this disclosure.

In the embodiment III of this disclosure, the UE initiates the RRC connection re-establishment after X2 or S1 handover fails, and the RRC connection re-establishment request message is sent to the target eNB of the UE during the handover. It can be that it is requested to be re-established to the cell connection of the target eNB during the handover, and also can be that it is requested to be re-established to other cell connections of the target eNB. The target eNB does not support the original access layer security algorithm used by the UE, and the access layer security algorithm needs to be updated. The specific flow is as shown in FIG. 5, mainly comprising the following steps.

Step 501, the UE sends the RRC connection re-establishment request message to the eNB.

Step 502, after receiving the RRC connection re-establishment request message, the eNB determines that itself is the target eNB during handover of the UE according to the current status and configuration.

Step 503, the eNB (target eNB) determines that the access layer security algorithm configured by the eNB itself does not support the original access layer security algorithm according to the original access layer security algorithm carried in the handover request message sent by the source eNB.

If at least one of the integrity protection algorithm and the encryption algorithm is not supported, the original access layer security algorithm is deemed to be not supported.

Step 504, the eNB (target eNB) selects the access layer security algorithm (comprising the integrity protection algorithm and the encryption algorithm) which has the highest priority and is supported by the UE, according to the access layer security algorithm configured by the eNB itself and the security capability of the UE carried in the handover request message, as the new access layer security algorithm.

Step 505, the eNB (target eNB) performs local configuration, wherein the newly-selected access layer security algorithm is carried when configuring the eNB (target eNB) user plane, that is, the eNB (target eNB) user plane configuration is implemented by using the newly-selected access layer security algorithm.

Step 506, the eNB (target eNB) generates the RRC connection re-establishment message, and sends the message to the UE, wherein the new access layer security algorithm is written into the access layer security algorithm configuration cell of the message, and the flag representing whether the access layer security algorithm configuration cell of the message exists is set to be "existence".

Step 507, after receiving the RRC connection re-establishment message, the UE determines that the flag representing whether the access layer security algorithm configuration cell exists in the message is set to be "existence". It represents that the access layer security algorithm is changed. The UE performs local configuration according to the information carried in the RRC connection re-establishment message, and enables the new access layer security algorithm carried in the message.

Step 508, the UE generates the RRC connection re-establishment complete message, and sends the message to the eNB (target eNB) after using the new access layer security algorithm to implement integrity protection and encryption for the message.

Step 509, the eNB (target eNB) receives the RRC connection re-establishment complete message from the UE, and uses the new access layer security algorithm to perform decryption and integrity check for the message. The flow ends.

It should be noted that, after the eNB receives the RRC connection re-establishment request message, if determining that the eNB itself is the target eNB during handover of the UE, it represents that the UE initiates the RRC connection re-establishment because the RRC re-configuration fails during handover of X2 interface or S1 interface. It is because, if the RRC connection re-establishment is initiated not due to handover failure, the eNB can directly return the RRC connection re-establishment reject message to the UE since the corresponding UE context cannot be found locally.

Figure 6:
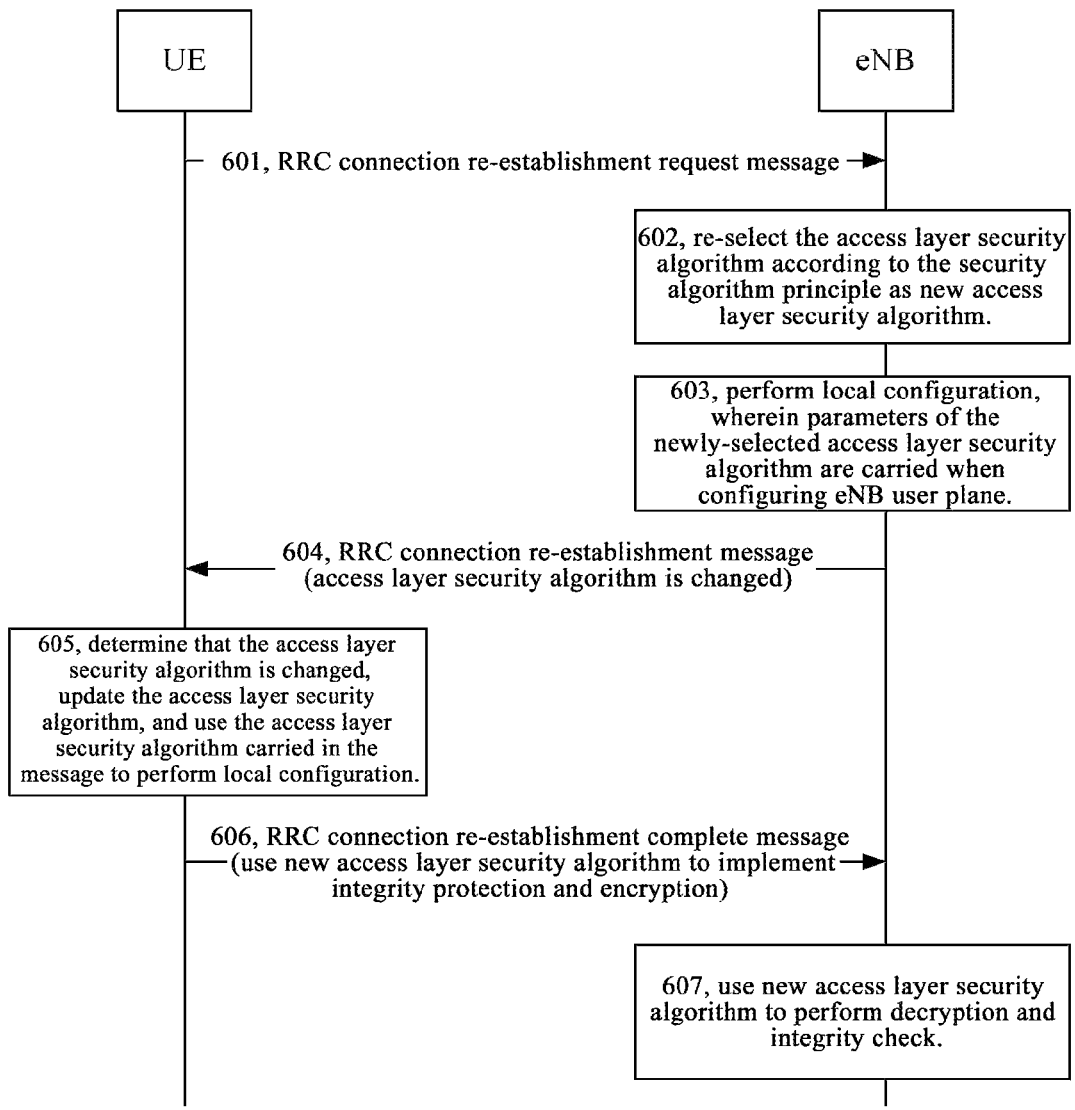
FIG. 6 shows a flowchart of a method for security processing during RRC connection re-establishment of embodiment IV of this disclosure.

In the embodiment IV of this disclosure, no matter when RRC connection re-establishment occurs, and no matter whether the RRC connection is re-established to the source eNB or the target eNB (including requesting to be re-established to the cell connection of the target eNB during the handover, and requesting to be re-established to other cell connections of the target eNB), the access layer security algorithm is updated in all situations. The specific flow is as shown in FIG. 6, mainly comprising the following steps.

Step 601, the UE sends the RRC connection re-establishment request message to the eNB.

Step 602, the eNB re-selects the access layer security algorithm (comprising the integrity protection algorithm and the encryption algorithm) which has the highest priority and is supported by the UE as the new access layer security algorithm according to the security capability of the UE stored in the eNB and the access layer security algorithm currently configured by the eNB.

Step 603, the eNB performs local configuration, wherein the newly-selected access layer security algorithm is carried when configuring the eNB user plane.

Step 604, the eNB generates the RRC connection re-establishment message, and sends the message to the UE, wherein the new access layer security algorithm is written into the access layer security algorithm configuration cell of the message, and the flag representing whether the access layer security algorithm configuration cell of the message exists is set to be "existence".

Step 605, after receiving the RRC connection re-establishment message, the UE determines that the flag representing whether the access layer security algorithm configuration cell exists in the message is set to be "existence". It represents that the access layer security algorithm is changed. The UE performs local configuration according to the information carried in the RRC connection re-establishment message, and enables the new access layer security algorithm carried in the message.

Step 606, the UE generates the RRC connection re-establishment complete message, and sends the message to the eNB after using the new access layer security algorithm to implement integrity protection and encryption for the message.

Step 607, the eNB receives the RRC connection re-establishment complete message from the UE, and uses the new access layer security algorithm to perform decryption and integrity check for the message. The flow ends.

In a conclusion, when the RRC connection is re-established to the target eNB of the UE during handover, if the target eNB does not support the original access layer security algorithm used by the UE, the target eNB only needs to re-select the access layer security algorithm for one time, and notify the RRC connection re-establishment message to the UE. The unnecessary RRC connection failure can be prevented. Thereby, the access success rate of UE is improved, and the user experience is enhanced.

The above are only the preferred embodiments of this disclosure and are not intended to limit the scope of protection of this disclosure.

What is claimed is:

1. A method for security processing during Radio Resource Control (RRC) connection re-establishment, wherein the method comprises:
   a User Equipment (UE) sending an RRC connection re-establishment request message to an Evolved Universal Terrestrial Radio Access Network (E-UTRAN) NodeB (eNB); and
   after receiving the RRC connection re-establishment request message, the eNB determining whether an original access layer security algorithm used by the UE is supported by the eNB itself according to a current status and configuration; and if supported, communication protection between the eNB and the UE being implemented via the original access layer security algorithm; if not supported, according to the security capability of the UE, a access layer security algorithm which has the highest priority and is supported by the UE being selected from access layer security algorithms configured by the eNB itself to be a new access layer security algorithm, and the communication protection between the eNB and the UE being implemented by the new access layer security algorithm.

2. The method for security processing during RRC connection re-establishment according to claim 1, wherein the eNB determining whether the original access layer security algorithm used by the UE is supported by the eNB itself comprises:
   according to the current status and configuration, if the eNB determines that the eNB itself is a source eNB connected to the UE before the UE sends the RRC connection re-establishment request message, determining that the eNB supports the original access layer security algorithm used by the UE; and
   according to the current status and configuration, if the eNB determines that the eNB itself is a target eNB during handover of the UE, the eNB determining whether an access layer security algorithm configured by the eNB itself supports the original access layer security algorithm used by the UE according to an original access layer security algorithm carried by a source eNB when sending a handover request message.

3. The method for security processing during RRC connection re-establishment according to claim 2, wherein the access layer security algorithm comprises an integrity protection algorithm and an encryption algorithm, and
   the eNB determining whether the access layer security algorithm configured by the eNB itself supports the original access layer security algorithm used by the UE comprises:
   if an integrity protection algorithm configured by the eNB itself supports an original integrity protection algorithm used by the UE, and an encryption algorithm configured by the eNB itself supports an original encryption algorithm used by the UE, the access layer security algorithm configured by the eNB being determined to support the original access layer security algorithm used by the UE; otherwise, the access layer security algorithm configured by the eNB being determined not to support the original access layer security algorithm used by the UE.

4. The method for security processing during RRC connection re-establishment according to claim 1, wherein implementing the communication protection between the eNB and the UE via the original access layer security algorithm comprises:
   the eNB performing local configuration according to the original access layer security algorithm;
   the eNB generating a RRC connection re-establishment message and sending the message to the UE, and a flag representing whether an access layer security algorithm configuration cell exists in the RRC connection re-establishment message being set to be "non-existence";
   after receiving the RRC connection re-establishment message, the UE determining that the flag representing whether the access layer security algorithm configuration cell exists in the message is set to be "non-existence", and performing local configuration according to information carried in the RRC connection re-establishment message, wherein configuration of the access layer security algorithm does not change;
   the UE generating a RRC connection re-establishment complete message, and sending the message to the eNB after performing integrity protection and encryption for the message by using the original access layer security algorithm; and
   after receiving the RRC connection re-establishment complete message, the eNB implementing decryption and integrity check for the received message by using the original access layer security algorithm.

5. The method for security processing during RRC connection re-establishment according to claim 1, wherein implementing the communication protection between the eNB and the UE via the new access layer security algorithm comprises:
   the eNB performing local configuration according to the new access layer security algorithm;
   the eNB generating a RRC connection re-establishment message and sending the message to the UE, wherein the RRC connection re-establishment message carries the new access layer security algorithm and a flag representing whether an access layer security algorithm configuration cell exists in the message is set to be "existence";
   after receiving the RRC connection re-establishment message, the UE determining that the flag representing whether the access layer security algorithm configuration cell exists in the message is set to be "existence", performing local configuration according to information carried in the RRC connection re-establishment message, and enabling the new access layer security algorithm carried in the message;

the UE generating a RRC connection re-establishment complete message, and sending the message to the eNB after performing integrity protection and encryption for the message by using the new access layer security algorithm; and after receiving the RRC connection re-establishment complete message, the eNB performing decryption and integrity check for the received message by using the new access layer security algorithm.

6. A method for security processing during RRC connection re-establishment, wherein the method comprises:

a UE sending a RRC connection re-establishment request message to an eNB; and after receiving the RRC connection re-establishment request message, according to security capability of the UE, the eNB selecting an access layer security algorithm which has the highest priority and is supported by the UE from access layer security algorithms configured by the eNB itself as a new access layer security algorithm, and implementing communication protection between the eNB and the UE via the new access layer security algorithm.

7. The method for security processing during RRC connection re-establishment according to claim 6, wherein implementing the communication protection between the eNB and the UE via the new access layer security algorithm comprises:

the eNB performing local configuration according to the new access layer security algorithm;

the eNB generating a RRC connection re-establishment message and sending the message to the UE, wherein the RRC connection re-establishment message carries the new access layer security algorithm and a flag representing whether an access layer security algorithm configuration cell exists in the message is set to be "existence";

after receiving the RRC connection re-establishment message, the UE determining that the flag representing whether the access layer security algorithm configuration cell exists in the message is set to be "existence", performing local configuration according to information carried in the RRC connection re-establishment message, and enabling the new access layer security algorithm carried in the message;

the UE generating a RRC connection re-establishment complete message, and sending the message to the eNB after performing integrity protection and encryption for the message by using the new access layer security algorithm; and after receiving the RRC connection re-establishment complete message, the eNB performing decryption and integrity check for the received message by using the new access layer security algorithm.

8. A system for security processing during RRC connection re-establishment, wherein the system comprises a UE and an eNB, the UE is configured to send a RRC connection re-establishment request message to the eNB, and implement communication protection between the eNB and the UE, and the eNB is configured to, after receiving the RRC connection re-establishment request message, determine whether an original access layer security algorithm used by the UE is supported by the eNB itself according to a current status and configuration; and if supported, implement the communication protection between the eNB and the UE via the original access layer security algorithm; and if not supported, according to security capability of the UE, select an access layer security algorithm which has the highest priority and is supported by the UE from access layer security algorithms configured by the eNB itself to be a new access layer security algorithm, and implement the communication protection between the eNB and the UE via the new access layer security algorithm.

9. The system for security processing during RRC connection re-establishment according to claim 8, wherein the eNB is further configured to, according to the current status and configuration, if determining that the eNB itself is a source eNB which is connected to the UE before the UE sends the RRC connection re-establishment request message, determine that the eNB supports the original access layer security algorithm used by the UE; and according to the current status and configuration, if determining that the eNB itself is a target eNB during handover of the UE, determine whether an access layer security algorithm configured by the eNB itself supports the original access layer security algorithm used by the UE, according to an original access layer security algorithm carried by a source eNB when sending a handover request message.

10. The system for security processing during RRC connection re-establishment according to claim 9, wherein the access layer security algorithm comprises an integrity protection algorithm and an encryption algorithm, and the eNB is further configured to, if an integrity protection algorithm configured by the eNB itself supports an original integrity protection algorithm used by the UE, and an encryption algorithm configured by the eNB itself supports an original encryption algorithm used by the UE, determine that the access layer security algorithm configured by the itself supports the original access layer security algorithm used by the UE; otherwise, determine that the access layer security algorithm configured by the eNB itself does not support the original access layer security algorithm used by the UE.

11. The system for security processing during RRC connection re-establishment according to claim 8, wherein the eNB is further configured to perform local configuration according to the original access layer security algorithm when implementing communication protection between the eNB and the UE via the original access layer security algorithm, generate a RRC connection re-establishment message and send the message to the UE, and set a flag representing whether an access layer security algorithm configuration cell exists in the RRC connection re-establishment message to be "non-existence";

the UE is further configured to determine that the flag representing whether the access layer security algorithm configuration cell exists in the message is set to be "non-existence" after receiving the RRC connection re-establishment message, and perform local configuration according to information carried in the RRC connection re-establishment message, wherein configuration of the access layer security algorithm does not change; and generate a RRC connection re-establishment complete massage, and send the message to the eNB after performing integrity protection and encryption for the message by using the original access layer security algorithm; and the eNB is further configured to, after receiving the RRC connection re-establishment complete message of the UE, use the original access layer security algorithm to perform decryption and integrity check for the received message.

12. The system for security processing during RRC connection re-establishment according to claim 8, wherein the eNB is further configured to perform the local configuration according to the new access layer security algorithm when implementing the communication protection between the eNB and the UE via the new access layer security algorithm, generate a RRC connection re-establishment message and send the message to the UE, wherein the RRC connection re-establishment message carries the new access layer security algorithm, and a flag representing whether an access layer security algorithm configuration cell exists in the message is set to be "existence";

the UE is further configured to, after receiving the RRC connection re-establishment message, determine that the flag representing whether the access layer security algorithm configuration cell exists in the message is set to be "existence", perform the local configuration according to information carried in the RRC connection re-establishment message, and enable the new access layer security algorithm carried in the message; and generate a RRC connection re-establishment complete message, and send the message to the eNB after performing integrity protection and encryption for the message via the new access layer security algorithm; and the eNB is further configured to, after receiving the RRC connection re-establishment complete message of the UE, perform decryption and integrity check for the received message by using the new access layer security algorithm.

13. The method for security processing during RRC connection re-establishment according to claim 2, wherein implementing the communication protection between the eNB and the UE via the original access layer security algorithm comprises:

the eNB performing local configuration according to the original access layer security algorithm;

the eNB generating a RRC connection re-establishment message and sending the message to the UE, and a flag representing whether an access layer security algorithm configuration cell exists in the RRC connection re-establishment message being set to be "non-existence";

after receiving the RRC connection re-establishment message, the UE determining that the flag representing whether the access layer security algorithm configuration cell exists in the message is set to be "non-existence", and performing local configuration according to information carried in the RRC connection re-establishment message, wherein configuration of the access layer security algorithm does not change;

the UE generating a RRC connection re-establishment complete message, and sending the message to the eNB after performing integrity protection and encryption for the message by using the original access layer security algorithm; and after receiving the RRC connection re-establishment complete message, the eNB implementing decryption and integrity check for the received message by using the original access layer security algorithm.

14. The method for security processing during RRC connection re-establishment according to claim 3, wherein implementing the communication protection between the eNB and the UE via the original access layer security algorithm comprises:

the eNB performing local configuration according to the original access layer security algorithm;

the eNB generating a RRC connection re-establishment message and sending the message to the UE, and a flag representing whether an access layer security algorithm configuration cell exists in the RRC connection re-establishment message being set to be "non-existence";

after receiving the RRC connection re-establishment message, the UE determining that the flag representing whether the access layer security algorithm configuration cell exists in the message is set to be "non-existence", and performing local configuration according to information carried in the RRC connection re-establishment message, wherein configuration of the access layer security algorithm does not change;

the UE generating a RRC connection re-establishment complete message, and sending the message to the eNB after performing integrity protection and encryption for the message by using the original access layer security algorithm; and after receiving the RRC connection re-establishment complete message, the eNB implementing decryption and integrity check for the received message by using the original access layer security algorithm.

15. The method for security processing during RRC connection re-establishment according to claim 2, wherein implementing the communication protection between the eNB and the UE via the new access layer security algorithm comprises:

the eNB performing local configuration according to the new access layer security algorithm;

the eNB generating a RRC connection re-establishment message and sending the message to the UE, wherein the RRC connection re-establishment message carries the new access layer security algorithm and a flag representing whether an access layer security algorithm configuration cell exists in the message is set to be "existence";

after receiving the RRC connection re-establishment message, the UE determining that the flag representing whether the access layer security algorithm configuration cell exists in the message is set to be "existence", performing local configuration according to information carried in the RRC connection re-establishment message, and enabling the new access layer security algorithm carried in the message;

the UE generating a RRC connection re-establishment complete message, and sending the message to the eNB after performing integrity protection and encryption for the message by using the new access layer security algorithm; and after receiving the RRC connection re-establishment complete message, the eNB performing decryption and integrity check for the received message by using the new access layer security algorithm.

16. The method for security processing during RRC connection re-establishment according to claim 3, wherein implementing the communication protection between the eNB and the UE via the new access layer security algorithm comprises:

the eNB performing local configuration according to the new access layer security algorithm;

the eNB generating a RRC connection re-establishment message and sending the message to the UE, wherein the RRC connection re-establishment message carries the new access layer security algorithm and a flag representing whether an access layer security algorithm configuration cell exists in the message is set to be "existence";

after receiving the RRC connection re-establishment message, the UE determining that the flag representing whether the access layer security algorithm configuration cell exists in the message is set to be "existence", performing local configuration according to information carried in the RRC connection re-establishment message, and enabling the new access layer security algorithm carried in the message;

the UE generating a RRC connection re-establishment complete message, and sending the message to the eNB after performing integrity protection and encryption for the message by using the new access layer security algorithm; and after receiving the RRC connection re-establishment complete message, the eNB performing decryption and integrity check for the received message by using the new access layer security algorithm.

17. The system for security processing during RRC connection re-establishment according to claim 9, wherein the eNB is further configured to perform local configuration according to the original access layer security algorithm when implementing communication protection between the eNB and the UE via the original access layer security algorithm, generate a RRC connection re-establishment message and send the message to the UE, and set a flag representing whether an access layer security algorithm configuration cell exists in the RRC connection re-establishment message to be "non-existence";

the UE is further configured to determine that the flag representing whether the access layer security algorithm configuration cell exists in the message is set to be "non-existence" after receiving the RRC connection re-establishment message, and perform local configuration according to information carried in the RRC connection re-establishment message, wherein configuration of the access layer security algorithm does not change; and generate a RRC connection re-establishment complete massage, and send the message to the eNB after performing integrity protection and encryption for the message by using the original access layer security algorithm; and the eNB is further configured to, after receiving the RRC connection re-establishment complete message of the UE, use the original access layer security algorithm to perform decryption and integrity check for the received message.

18. The system for security processing during RRC connection re-establishment according to claim 10, wherein the eNB is further configured to perform local configuration according to the original access layer security algorithm when implementing communication protection between the eNB and the UE via the original access layer security algorithm, generate a RRC connection re-establishment message and send the message to the UE, and set a flag representing whether an access layer security algorithm configuration cell exists in the RRC connection re-establishment message to be "non-existence";

the UE is further configured to determine that the flag representing whether the access layer security algorithm configuration cell exists in the message is set to be "non-existence" after receiving the RRC connection re-establishment message, and perform local configuration according to information carried in the RRC connection re-establishment message, wherein configuration of the access layer security algorithm does not change; and generate a RRC connection re-establishment complete massage, and send the message to the eNB after performing integrity protection and encryption for the message by using the original access layer security algorithm; and the eNB is further configured to, after receiving the RRC connection re-establishment complete message of the UE, use the original access layer security algorithm to perform decryption and integrity check for the received message.

19. The system for security processing during RRC connection re-establishment according to claim 9, wherein the eNB is further configured to perform the local configuration according to the new access layer security algorithm when implementing the communication protection between the eNB and the UE via the new access layer security algorithm, generate a RRC connection re-establishment message and send the message to the UE, wherein the RRC connection re-establishment message carries the new access layer security algorithm, and a flag representing whether an access layer security algorithm configuration cell exists in the message is set to be "existence";

the UE is further configured to, after receiving the RRC connection re-establishment message, determine that the flag representing whether the access layer security algorithm configuration cell exists in the message is set to be "existence", perform the local configuration according to information carried in the RRC connection re-establishment message, and enable the new access layer security algorithm carried in the message; and generate a RRC connection re-establishment complete message, and send the message to the eNB after performing integrity protection and encryption for the message via the new access layer security algorithm; and the eNB is further configured to, after receiving the RRC connection re-establishment complete message of the UE, perform decryption and integrity check for the received message by using the new access layer security algorithm.

20. The system for security processing during RRC connection re-establishment according to claim 10, wherein the eNB is further configured to perform the local configuration according to the new access layer security algorithm when implementing the communication protection between the eNB and the UE via the new access layer security algorithm, generate a RRC connection re-establishment message and send the message to the UE, wherein the RRC connection re-establishment message carries the new access layer security algorithm, and a flag representing whether an access layer security algorithm configuration cell exists in the message is set to be "existence";

the UE is further configured to, after receiving the RRC connection re-establishment message, determine that the flag representing whether the access layer security algorithm configuration cell exists in the message is set to be "existence", perform the local configuration according to information carried in the RRC connection re-establishment message, and enable the new access layer security algorithm carried in the message; and generate a RRC connection re-establishment complete message, and send the message to the eNB after performing integrity protection and encryption for the message via the new access layer security algorithm; and the eNB is further configured to, after receiving the RRC connection re-establishment complete message of the UE, perform decryption and integrity check for the received message by using the new access layer security algorithm.

* * * * *